Mar. 6, 1923. Re. 15,553
S. M. LILLIE
SURFACE CONDENSER
Original Filed Apr. 18, 1919
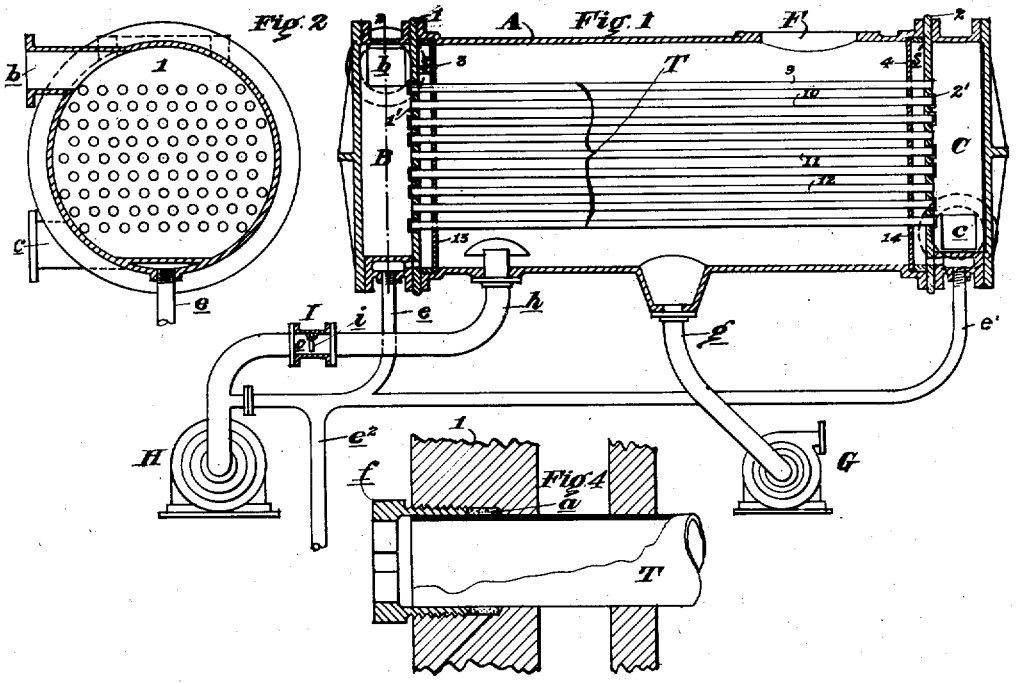
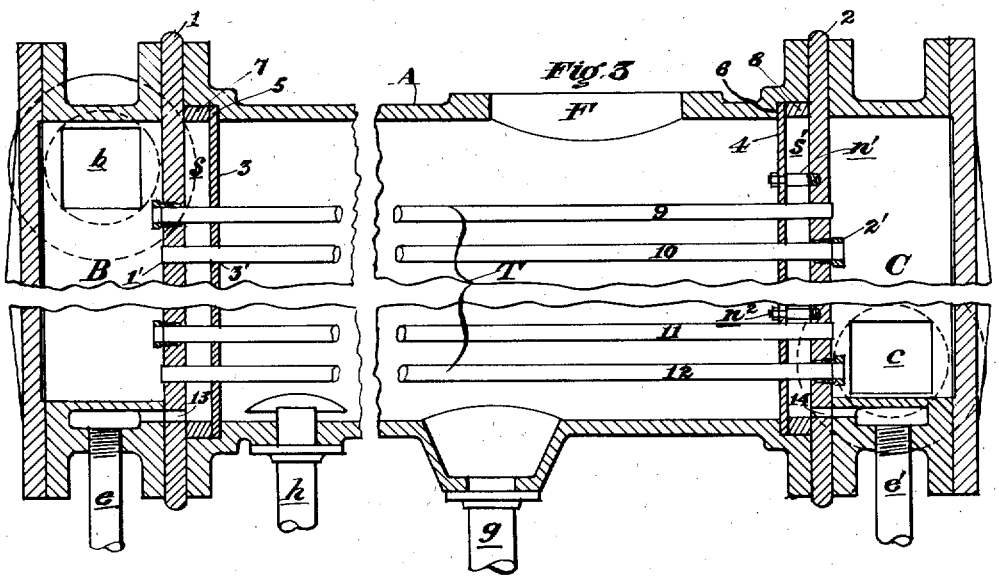
WITNESS:
Colin D. Smith
M. J. Choate
INVENTOR:
S. Morris Lillie Reissued Mar. 6, 1923. Re. 15,553

UNITED STATES PATENT OFFICE.

SAMUEL MORRIS LILLIE, OF PHILADELPHIA, PENNSYLVANIA.

SURFACE CONDENSER.

Original No. 1,335,692, dated March 30, 1920, Serial No. 291,159, filed April 18, 1919. Application for reissue filed March 28, 1922. Serial No. 547,527.

*To all whom it may concern:*

Be it known that I, SAMUEL MORRIS LILLIE, a citizen of the United States, residing at 4804 Springfield Avenue, in the city of Philadelphia, in the county of Philadelphia and State of Pennsylvania, have invented new and useful Improvements in Surface Condensers—such, for example, as are employed for condensing the exhaust steam from steam turbines and engines, or, more specifically, improvements in that construction of surface condenser in which tubes extend through a tube plate from a water chamber on one side of the tube plate, into which chamber the tubes open, into and out of a steam-condensing chamber, usually through another tube plate into a third chamber, into which the tubes also open.

Following the usual construction and operation, the chambers are closed to the atmosphere, the steam to be condensed is led into the second of the mentioned chambers and into contact with the exterior surface of the tubes, and a cooling water or liquid is sent through the tubes from a chamber into which the tubes open at one end into the chamber into which the other ends of the tubes open. The cooling water or liquid enters one of these chambers, and leaves the other of the two after being heated by the condensing steam. The condensate formed from the condensing steam is taken away from its chamber through a discharge below the tubes.

Under the usual practice the pressure in the water chambers of the condenser is greater than that in the condensing chamber, and a trouble that is frequently experienced is the leakage of cooling water or liquid, through the tube plates along the external surfaces of the tubes into the condensing chamber with the result of contaminating the condensate from the steam with cooling water or liquid.

The object of my invention is to prevent or to greatly lessen this leakage or seepage of the cooling liquid into the distillate from the steam, and also to prevent the passing into the distillate of any air which may leak into the interior of the condenser through or around the tube plates. My invention consists in placing a secondary tube plate or diaphragm near a tube plate on the steam or condensing side of the tube plate, through which diaphragm the tubes also extend and between which and the tube plate a thin chamber closed at the bottom, at least, is formed between the tube plate and the condensing chamber, into which thin chamber will collect leakage of liquid or air through the tube plate around the tubes or otherwise, means being provided for removing the leakage from the thin chamber.

My invention is illustrated in the accompanying sheet of drawings by an ordinary single pass surface condenser, in the several figures of which drawings like parts are designated by like characters.

Figure 1 is a longitudinal axial section of a cylindrical condenser embodying my invention with connected air and distillate pumps.

Figure 2 is an end view of Fig. 1 looking at the left end of Fig. 1. It is a section of Fig. 1 parallel to the tube plate along the line 2. It shows one of the tube plates and the ends and spacing of the tubes opening through it.

Fig. 3 is a larger view than Fig. 1 of the condenser: portions of it with respect to both longitudinal and cross dimensions are broken out.

Fig. 4 is a detail view—showing a part of a tube plate and of its adjacent secondary tube plate with a tube extending through both, and a method of "packing" a tube in the tube plate.

The type of condenser illustrated in the drawings is almost universally employed for steam engines and turbines, though usually with two or more "passes" for the cooling water to flow through the cooling tubes. It is abundantly illustrated and described in the publicity matter of many manufacturers, and is fully known to those skilled in the art. In view of this, particular description of construction will be avoided in the following specification.

Referring to the drawings A is the condensing chamber of this well known type of condenser. F is the vapor or steam main leading into the condensing chamber. Water chambers B and C with tube plates 1—2 close the ends of the condensing chamber A. A battery of cooling tubes T extends through the condensing chamber and tube plates 1—2 and open into the water chambers B and C.

The tubes in this condenser are, with the exceptions noted below, supposed to be packed in each tube plate by means of fiber *a*, and screw ferrule *f* in the usual manner which is illustrated in Fig. 4 for a single tube. *c* is an opening into the lower part of chamber C, to which a cooling water supply line may be connected, and *b*, is an opening above the tube line into the chamber B to which a cooling water discharge pipe may be connected. A centrifugal condensate pump G is connected by the pipe *g*, to the bottom of the condenser at its lowest point, and an air pump, H assumed to be of the hydraulic type, connects to the bottom of the condensing chamber A, by the pipe *h*. In the condensing chamber A, a short distance from the tube plate 1, is a secondary tube plate 3, in the chamber A, a short distance from the tube plate 2, is the secondary tube plate 4, the plates 3 and 4 as illustrated in the drawings extend respectively into recesses 5 and 6 formed in the shell of the chamber with distance rings 7 and 8 between them and the tube plates 1 and 2, respectively. Practically vapor and water tight joints are formed between the plates 3 and 4, and the condenser shell particularly at the bottom. The tubes pass through the secondary tube plates with sliding fits or with as little play as may be. Each secondary tube-plate 3 or 4 may be held firmly at the designed distance from its tube-plate 1 or 2, by expanding some of the tubes in said tube-plates, as at 1′ and 3′. In the opposite tube-plate and secondary tube-plate these tubes are not expanded, but are packed, as at 2′, in the said opposite tube-plate as illustrated for example in Fig. 4. These particular cooling tubes are distributed over the cross section of the condenser, some of them are expanded in the tube-plate and secondary plate at one end of the condenser while the remainder of them are expanded in the tube plate and secondary plate at the other end of the condenser. The number and distribution of these binding tubes would be left to the judgment of the designer and would vary with conditions. Each of these binding tubes is free to expand and contract through its packing in one of the tube plates. Binding tubes are illustrated by tubes 9—10—11—12, each of which is expanded in one tube plate and in its adjoining secondary tube plate, while it has a sliding fit in the other pair of tube plates, and is packed in the main tube plate 1 or 2, as the case may be. The cooling tubes may thus easily be made means for binding together a tube plate and its secondary tube plate, but other means may be used, for example by distance pieces fastened to both plates, as illustrated by the examples at $n'$ and $n^2$. Fig. 3, each of which represents a pin fastened firmly to the tube plate 2, and also to the plate 4 in any efficient manner. At the bottom of the space *s* between plates 1 and 3, a drain passage 13 leads to the outside of the condenser and then through the pipe *e* connects to an exhausting drain, in the drawings it is to the suction line of the air pump H. The space *s′* between the two plates, 2 and 4 is provided with a similar drain passage 14, and pipe *e′* leading to the suction of the exhausting pump H, which is the air pump for the condenser in this case. In the air line *h* between the chamber A, and the point where the drain lines 13 and 14 join with the suction line to the air pump H, is placed a device I for maintaining a slight back pressure toward the chamber A, and therefore a slightly greater pressure in A, than in the spaces between each tube plate and its secondary tube plate. This device is represented in the drawings by a swinging plate *i* suspended in a chamber *o* formed in the air line, *h*, in and across the path of the air through the line, so that its resistance to the flow of the air will cause a slight back pressure in the line toward the chamber A.

The mode of operation for the condenser and adjuncts above described is as follows:

The steam or vapor to be condensed is led into the interior of the chamber A through the inlet F, cooling water is delivered continually through inlet *c* into the water chamber, C, from which it flows through the battery T of cooling tubes into the chamber B, and away from the chamber B through the discharge outlet, *b*, and the air pump H, which has been started maintains a greater or less vacuum in the condensing chamber A, and a very slightly greater vacuum in the spaces *s*, *s′*. The vapors condense on the cooling tubes, the condensate falls to the bottom of the chamber, and is taken away from it by the condensate pump G through the connecting pipe *g*. Any leakage of water from either water chamber B or C through the packings around the cooling tubes, or through any other source for leakage, passes into the space *s*, or *s′* falls to the bottom of the space, and escapes through the drain 13 or 14 to the exhausting device, which in the drawings is the hydraulic air pump H of the condenser. If the condenser is at sufficient altitude, a barometric tube $e^2$ might extend to a sealing tank below, and the leakage water be taken away through this tube. The very slightly greater vacuum in the spaces *s*, *s′* than in the chamber A makes it difficult for water which, after leaking by tube packings in a tube plate, may creep along a tube to the secondary tube plate 3 or 4, to pass by the secondary tube plate into the chamber A, and therefore into the condensate, and it likewise prevents any air passing into the condensate which may get into the spaces *s*, *s′*, through or around the main tube plates or otherwise. Sometimes in condensers of the class illustrated, the cooling tubes are all expanded into the tube plate at one end of the condensing chamber A, as plate 2, for example, and in the other plate are secured by packings, of some description. In a condenser thus constructed the secondary tube plate may be dispensed with at the end of the chamber A toward the plate in which the tubes are expanded.

I claim as of my invention:

1. In a tubular surface condenser of the general construction herein described, a secondary tube plate located near a tube plate on the condensing chamber side of the tube plate, and containing holes for the tubes corresponding to the holes in the tube plate through which corresponding holes the tubes extend and means for removing from the space between the tube plate and secondary tube plate any liquid or air which may collect in the said space.

2. In a tubular surface condenser of the general construction herein described, a secondary tube plate located near a tube plate on the condensing chamber side of the tube plate, and containing holes for the tubes corresponding to the holes in the tube plate through which corresponding holes the tubes extend, and means for removing from the space between the tube plate and secondary tube plate any liquid or air which may collect in the said space, and means for maintaining in the said inclosed space a pressure less than in the condensing chamber of the condenser.

3. In a tubular surface condenser of the general construction herein described, a secondary tube plate located near a tube plate on the side of the tube plate toward the condensing chamber containing tube holes corresponding to the tube holes in the tube plate through which corresponding holes the cooling tubes extend, and forming with the tube plate a space for collecting leakage through the tube plate, connecting means between the tube plates and secondary tube plate fastened to each, and tending to hold them rigidly in their positions relative to each other.

4. In a tubular surface condenser of the general construction herein described, a secondary tube plate located near a tube plate on the side of the tube plate toward the condensing chamber containing tube holes corresponding to the tube holes in the tube plate through which corresponding holes the cooling tubes extend, and forming with the tube plate a space for collecting leakage through the tube plate, means tending to hold the tube plate and its secondary tube plate rigidly in their relative positions consisting in a number of cooling tubes expanded in the tube plate and in its secondary tube plate.

5. In a tubular surface condenser of the general construction herein described, a secondary tube plate located near a tube plate on the side of the tube plate toward the condensing chamber containing tube holes corresponding to the tube holes in the tube plate through which corresponding holes the cooling tubes extend, and forming with the tube plate a space for collecting leakage through the tube plate, means tending to hold the tube plate and its secondary tube plate rigidly in their relative positions consisting in a number of cooling tubes expanded in the tube plate and in its secondary plate, and in the tube plate at the opposite end of the condensing chamber packed in any way to permit sliding of the tubes in the tube plate.

6. In a tubular surface condenser of the general construction herein described, a tube plate covering an end of the condensing chamber, a recess formed inside the end of the shell of the condensing chamber toward the tube plate and extending back from the tube plate a short distance, a secondary tube plate such as described extending into the recess and a distance piece located in the recess between the tube plate and the secondary tube plate and operating to press the secondary tube plate toward the shoulder of the recess when the tube plate is fastened in its place.

7. In a tubular surface condenser of the general construction herein specified and having a secondary tube plate adjacent to a tube plate of the condenser with a leakage collecting space between the two plates, an air pump connected by air pipe line to the condensing chamber, which operates to remove the incondensable gases from the chamber, and a pipe connection between the suction port of the air pump and the space between the tube plate and secondary tube plate.

8. In a tubular surface condenser of the general construction herein specified and having a secondary tube plate adjacent to a tube plate of the condenser with a leakage collecting space between the two plates, an air pump connected by air pipe line to the condensing chamber, which operates to remove the incondensable gases from the chamber, a pipe connection between the suction port of the air pump and the space between the tube plate and secondary tube plate, and a yielding obstruction located in the air pipe line between condensing chamber and air pump and operating to increase slightly the difference in pressure between condensing chamber and suction port of air pump.

9. In a tubular condenser of the general construction herein specified and having a secondary tube plate adjacent to a tube plate of the condenser with a leakage collecting space between the two plates, and means for removing incondensable gases from the leakage space between the two plates.

10. In a tubular condenser of the general construction herein specified and having a secondary tube plate adjacent to a tube plate of the condenser with a leakage collecting space, between the two plates, and means for removing incondensable gases from the leakage space between the two plates and for maintaining in this leakage space a slightly lower pressure than the pressure existing in the condensing chamber.

SAMUEL MORRIS LILLIE.